United States Patent
Minami (10) Patent No.: US 7,372,537 B2
(45) Date of Patent: May 13, 2008

(54) PRINT PROCESSING APPARATUS CAPABLE OF CALIBRATION PRINTING

(75) Inventor: Tokuo Minami, Wakayama (JP)

(73) Assignee: Noritsu Koki Co., Ltd., Wakayama-ken (JP)

( * ) Notice: Subject to any disclaimer, the term of this patent is extended or adjusted under 35 U.S.C. 154(b) by 275 days.

(21) Appl. No.: 11/124,299

(22) Filed: May 5, 2005

(65) Prior Publication Data

US 2005/0248738 A1 Nov. 10, 2005

(30) Foreign Application Priority Data

May 10, 2004 (JP) .............................. 2004-139476

(51) Int. Cl.
G03B 27/32 (2006.01)
G03B 27/52 (2006.01)
H04N 1/21 (2006.01)

(52) U.S. Cl. ........................... 355/27; 355/40; 358/302

(58) Field of Classification Search .................. 355/29, 355/30, 39, 40, 27; 386/127; 358/302, 1.9
See application file for complete search history.

(56) References Cited

U.S. PATENT DOCUMENTS

2002/0196474 A1* 12/2002 Toki et al. .................. 358/302
2003/0128381 A1* 7/2003 Zaima ........................ 358/1.9
2005/0207740 A1* 9/2005 Fukushima .................. 386/127

FOREIGN PATENT DOCUMENTS

JP 2000-241893 9/2000

* cited by examiner

Primary Examiner—Peter B. Kim
(74) Attorney, Agent, or Firm—Fulbright & Jaworski LLP (57) ABSTRACT

A photographic printing apparatus includes a transporting section for cutting photosensitive material drawn from one of a plurality of magazines each accommodating therein an elongated photosensitive material into a print size piece by a cutter unit and then feeding this material piece into an exposing unit, an order executing unit for effecting exposure of image data at the exposing unit on the material piece transported by the transporting section and a calibration printing unit for effecting exposure of predetermined calibration data at the exposing unit on the material piece transported by the transporting section. The calibration printing unit is operable to effect an all calibration mode operation in which the plural magazines are designated one after another, the photosensitive materials from the respective designated magazines are cut into the print size pieces and the exposing operations of the predetermined calibration data for indicating an exposure center position relative to the width of the photosensitive material are effected on the print size pieces one after another continuously.

4 Claims, 8 Drawing Sheets

PRINT PROCESSING APPARATUS CAPABLE OF CALIBRATION PRINTING

This application claims priority from JP2004-139476 filed May 10, 2004 herein incorporated by reference in its entirety.

BACKGROUND OF THE INVENTION

1. Field of the Invention

The present invention relates to a photographic printing apparatus including a transporting section for cutting photosensitive material drawn from one of a plurality of magazines each accommodating therein an elongate photosensitive material into a print size piece and then feeding this material piece into an exposing unit, an order executing means for effecting exposure of image data at the exposing unit on the material piece transported by the transporting section and a calibration printing means for effecting exposure of predetermined calibration data at the exposing unit on the material piece transported by the transporting section.

2. Description of the Related Art

As a technique relating to the photographic printing apparatus having the above-described construction, there is a lab system known from Japanese Patent Application "Kokai" No. 2000-241893.

This lab system includes a polygon mirror for reflecting beams from R, G, B laser sources and a laser exposing section for exposing a print paper (an example of "photosensitive material") by beams guided by an fθ lens from the sources.

This lab system further includes two magazines for respectively feeding print paper to the laser exposing section, a density determining section for determining an image density of the print paper recording a calibration pattern thereon, a storing means for storing data relating to e.g. the kinds of the print papers stored within the two magazines, lookup tables, etc. and a main controller for controlling these components.

The main controller is operable to execute exposure of the print paper with outputting medium information (a magazine ID, kind of print paper, etc.) and outputting condition information (e.g. the date, temperature, etc. at the time of the output) by the exposure at the laser exposing section.

With the above-described construction, this lab system is capable of calibration of its lookup table for each magazine by charging the print paper after its exposure and development into the density determining section and then determining an image density thereof.

In the case of the photographic printing apparatus having a plurality of magazines, as described in the patent document described above, management of exposure density is needed for each type of photosensitive material. In addition, there is also needed adjustment of an exposure position of image data to be exposed on each photosensitive material.

More particularly, with this type of photographic printing apparatus, the photosensitive material from each magazine is transported as being clamped by plural rollers to the exposing unit or the material from the magazine is guided to the exposing unit by means of a rail-like guide member which contacts the width-wise opposed edges of the material.

Also, with this type of photographic printing apparatus, each magazine and each transporting passage (lane) associated therewith are fixedly set in position relative to each other such that the width-wise center of the material from the magazine may be aligned with the center of the predetermined transporting passage.

With the above apparatus and even with a further apparatus including a plurality of guide passages corresponding to the respective magazines and a subsequent combined guide passage for confluently guiding the materials to the exposing unit, even with proper setting of the magazines, if there exists even a slight error (or tolerance) in the relative positional relations between the guide passages, the center position of the exposure at the exposing unit in the main scanning direction can sometimes be displaced to either direction from the center portion in the main scanning direction of the photosensitive material.

Further, since there exist slight dimensional tolerances in the individual magazines, even if the photosensitive material is appropriately accommodated in the form of a roll within the magazine, the center position in the main scanning direction of the image data formed on the photosensitive material by the exposure at the exposing unit can sometimes be displaced to either side from the center position in the main scanning direction of the photosensitive material.

Occurrence of such displacement (displacement or error in the exposing position) was known in the art. Hence, to cope with this problem, in the case of the conventional photographic printing apparatus, a test printing operation of image data which allows discrimination of the center position of the data in the main scanning direction is effected for each magazine. Then, based on the result of this test printing, adjustment of the exposing position of image data for each magazine is effected. Hence, this process was troublesome. Especially, in the case of a photographic printing apparatus having three or more magazines, the test printing operations for these respective magazines was labor and time consuming. Hence, there has been a desire from the industry for improvement in this respect.

SUMMARY OF THE INVENTION

In view of the above-described state of the art, a primary object of the present invention is to provide a photographic printing apparatus having a plurality of magazines, which apparatus allowing test printing operation for each magazine on photosensitive material fed to an exposing unit to be effected speedily and easily.

For accomplishing the above-noted object, according to the present invention, there is proposed a photographic printing apparatus comprising:

a transporting section for cutting photosensitive material drawn from one of a plurality of magazines each accommodating therein an elongate photosensitive material into a print size piece by a cutter unit and then feeding this material piece into an exposing unit;

an order executing means for effecting exposure of image data at the exposing unit on the material piece transported by the transporting section; and a calibration printing means for effecting exposure of predetermined calibration data at the exposing unit on the material piece transported by the transporting section;

wherein said calibration printing means is operable to effect an all calibration mode operation in which the plural magazines are designated one after another, the photosensitive materials from the respective designated magazines are cut into the print size pieces and the exposing operations of the predetermined calibration data for indicating an exposure center position relative to the width of the photosensitive material are effected on the print size pieces one after another continuously.

With the above construction, when the operator selects the all calibration mode, the apparatus effects the all calibration mode operation in which the plural magazines are designated one after another, the photosensitive materials from the respective designated magazines are cut into the print size pieces and the exposing operations of the predetermined calibration data for indicating an exposure center position relative to the width of the photosensitive material are effected on the print size pieces one after another continuously. Hence, the predetermined calibration data for indicating an exposure center position relative to the width of the photosensitive material are exposed automatically on the plurality of photosensitive material pieces sent from the plural magazines into the exposing unit via the transporting section Therefore, the operator need not effect the exposure of calibration data for each of the plurality of magazines. As a result, when calibration is to be effected on the photosensitive materials in all magazines, this can be done with one time operation.

According to a preferred embodiment of the present invention, the photographic printing apparatus further comprises:

a processing unit for effecting the exposure of the image data by the order executing means and effecting also the exposure of the calibration data by the calibration printing means; and a display unit for displaying processing information processed by the processing unit;

wherein when an operator selects a calibration operation, said processing unit causes said display unit to display an individual calibration mode button for effecting an individual calibration mode operation for each of the plural magazines and an all calibration mode button for effecting said all calibration mode operation, and after the exposure of the calibration information, said processing unit causes said display unit to display, for each magazine, a calibration screen for allowing adjustment of a center of the exposure position relative to the photosensitive material from that magazine.

With this construction, when calibrations of exposure positions for the photosensitive materials from the plurality of magazines are to be effected, this can be done simply by the operator's selecting the all calibration mode button which is being displayed on the display unit. Then, when the operator grasps a necessary adjustment amount in the exposure position relative to the main scanning direction based on the photosensitive materials (pieces) printed with the calibration data by the above operation, the operator can carry out the necessary calibration with reference to the calibration screen which is being now displayed on the monitor unit. Hence, the exposure operation of the calibration data and the actual calibration operation can both be carried out on the monitor screen of the display unit.

Preferably, said all calibration mode operation processes character information for identifying a magazine or a transporting lane for the photosensitive material, in addition to the calibration information.

With the above construction, it becomes possible to identify a magazine or a transporting lane for the photosensitive material, based on the character information formed on the photosensitive material having the calibration data formed thereon. That is, it is conceivable to print such information for identifying a magazine or a transporting lane for the photosensitive material on the back face of the photosensitive material. If this information is printed on the back face, the operator can readily recognize which magazine or transporting lane the photosensitive material corresponds to. Hence, the construction allows speedy operation.

Preferably, said calibration data further includes data for identifying a size of the photosensitive material along a sub scanning direction, in addition to the data for indicating the exposure center position.

With this construction, if the additional data is realized as a graduation or the like formed by exposure which allows grasp of the size of the material in the sub scanning direction, the operator can appropriately grasp the size of the photosensitive material relative to the sub scanning direction, i.e. its cutting size to be cut by a cutter unit. Hence, calibration for obtaining an appropriate cutting size or length is made possible also.

Further and other features and advantages of the invention will become apparent upon reading the following detailed description of preferred embodiments thereof with reference to the accompanying drawings.

DESCRIPTION OF THE PREFERRED EMBODIMENTS

Preferred embodiments of the present invention will be described in details with reference to the accompanying drawings.

Figure 1:
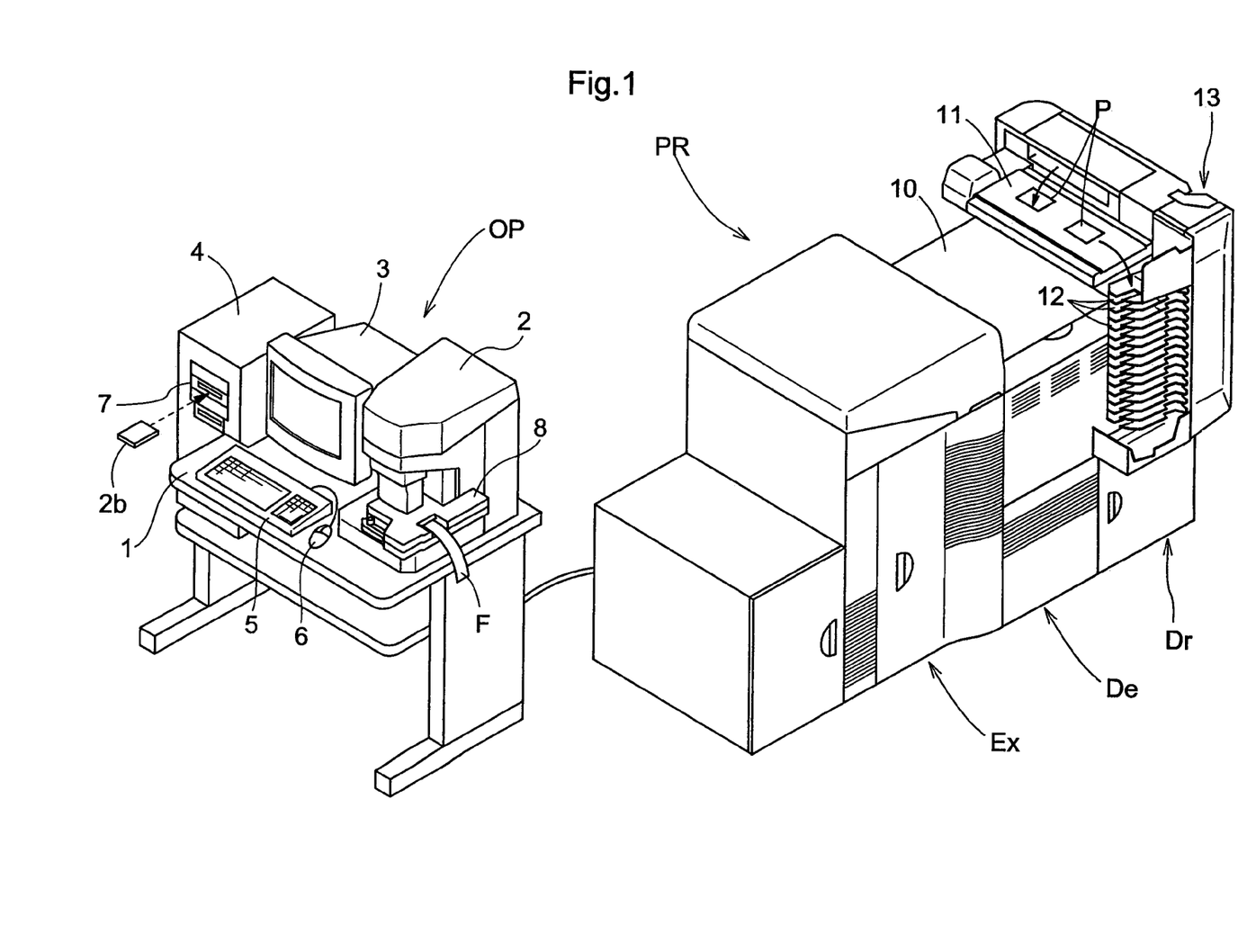
FIG. 1 is a perspective view of a photographic printing apparatus.

FIG. 1 shows a photographic printing apparatus commonly known as "digital mini-lab". The apparatus consists mainly of an operator's station OP and a print station PR. In the operator's station OP, image information of a developed photographic film F (referred to as "film F" hereinafter) is converted into digital signals and necessary operations are effected on this digitized image information and basic control operation of the entire system is also effected in this station In the print station PR, an exposure operation and a developing operation are effected on a silver salt print paper P (referred to as "print paper P" hereinafter) as an example of photosensitive material and the exposed and developed print paper P is then dried and discharged for a subsequent process.

The operator's station OP includes a desk-like console 1, a film scanner 2 for converting each frame image information of the film F into digital signals through a photoelectric conversion and sending these signals to the console 1, a display unit 3 for displaying various kinds of information, a processing unit 4 comprised of a general-purpose computer for realizing an image processing operation and various kinds of other operations, a keyboard 5 placed on the top face of the desk-like console 1 for allowing input of information, and a mouse 6 acting as a pointing device.

The processing unit 4 includes a media drive 7 adapted for obtaining information from various types of data storage media including a disc type medium such as a CD-R, an MO, an FD, etc, as well as a semiconductor type storage medium, and storage devices such as a semiconductor memory, a hard disc (not shown) for storing information in the unit.

Referring to the film scanner 2, a beam from a beam source disposed at a lower section of the scanner is irradiated on the film F supported to a film carrier 8 and an optical image from this film F is guided via a zooming lens to a CCD type photoelectric converter, which then inputs the image as image data decomposed in the three primary colors or R (red), G (green) and B (blue).

More particularly, with this film scanner 2, the film carrier 8 adapted for the size of each particular film F is mounted on the top face of the beam source and then a scanning operation is initiated. With this, in synchronism with a transporting operation of the film F along a sub scanning direction (longitudinal direction), the photoelectric converter scans the image of this film F along the main scanning direction and digitizes and inputs this information. The image data inputted by the operation is then transmitted to the processing unit 4 to be stored within the semiconductor memory or the hard disc.

The processing unit 4 includes a GUI (Graphical User Interface) type interface for realizing various operations in response to an operator's operation on the keyboard 5 or the mouse 6 based on information being displayed on the display unit 3. According to this GUI, in response to an operator's command for a printing operation, the image data inputted via the film scanner 2 or other image data inputted from a data storage device via the media drive 7 is stored in the semiconductor memory or the hard disc. And, if needed, a correction information will be effected on such image data, with the data being displayed on the display unit 3. Thereafter, the image data to be printed and customer's order information relating to e.g. a print size, the number of prints to be made will be transmitted to the print station PR to be subjected to a printing operation therein.

Figure 2:
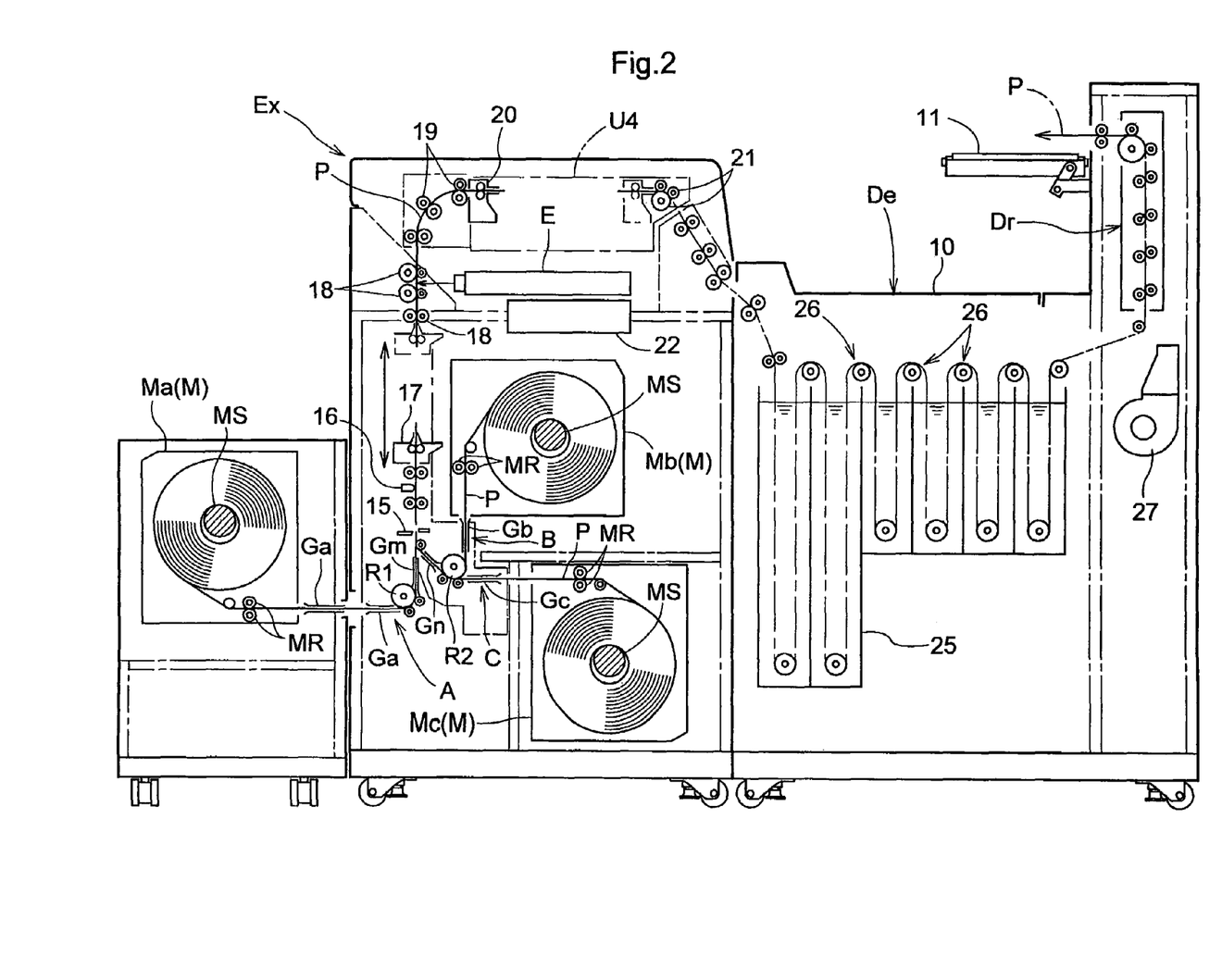
FIG. 2 is a front view sin vertical section of a print station.

This print station PR, as shown in FIGS. 1 and 2, includes an exposing section Ex, a developing section De and a drying section Dr, with all these sections Ex, De, Dr being accommodated within a housing 10. On the outside of the housing 10, the station PR includes a transporting belt 11 for horizontally transporting the print paper P discharged from an upper portion of the housing 10 after operations thereof and a sorter device 13 having a plurality of trays 12 for receiving and stacking thereon a plurality of print papers P sent from the transporting belt 11 according to respective customer's orders.

The exposing unit Ex includes, at a lower portion thereof, three print paper magazines M each storing therein an elongate print paper P and includes, at an upper portion thereof, an exposing unit E. For effecting a printing operation, the elongate print paper P stored in the form of a roll within one of the three print paper magazines M is drawn out and cut into a print size piece to be introduced into the exposing unit E to be exposed therein and then this exposed paper piece is sent to the developing section De. For realizing these transporting operations, a transporting mechanism is provided in the unit.

FIG. 2 shows the three print paper magazines M as Ma, Mb, Mc, respectively. The transporting mechanism includes a guide plate Ga for guiding the print paper P from the magazine Ma, a clamping type first advance roller R1 and a guide plate Gm for guiding the print paper P from the first advance roller R1 to a main transporting passage which is formed vertical. The transporting mechanism further includes guide plates Gb, Gc for guiding the print papers P from the magazines Mb, Mc, a clamping type second advance roller R2 and a guide plate Gn for guiding the print paper P from the second advance roller R2 to the main transporting passage.

The guide plate G (referring generically to any one of the guide plates Ga, Gb, Gc and the guide plates Gm, Gn) includes at least members to be disposed on the sides of the front and back opposed faces of the print paper P. Incidentally, this guide plate can be realized as a guide plate having plate members together forming an angular hook like cross section and disposed across the print paper P across the width thereof for guiding opposed width-wise ends of the print paper 2, with a distance between the plate members being adjustable.

Further, there are provided along the main transporting passage, a cutter unit 15 for cutting the print paper P into the print size, a dot-impact type printing head 16 for printing necessary information on the back face of the print paper P, a chuck unit 17 for clamping the print paper P for transporting it upward, a plurality of exposure transport rollers 18 each switchable between a clamped condition and an open condition, two chuckers 20 for sorting the print paper P to one of two sorting passages and a plurality of introducing rollers 21.

Each of the print paper magazines Ma, Mb, Mc includes a shaft portion MS for supporting the print paper P in the form of roll by an external drive force, and a clamping type roller MR for clamping the print paper P. In operation, as the shaft portion MS and the drive roller MR are driven, the print paper P can be introduced to or drawn out of the print paper magazine M.

As shown in the same figure, the exposing section Ex incorporates therein a controlling unit 22 for realizing the operation for feeding the print paper P to the exposing unit E and the operation for causing the exposing unit E to effect the exposure of image data thereon. A control scheme adopted by this controlling unit 22 will be briefly described next.

For exposure of a print paper P, one of the three print paper magazines Ma, Mb, Mc is designated. Then, the print paper P from the designated magazine M is sent to the main transporting passage by the transporting force of the first advance roller R1 or the second advance roller R2. In this main transporting passage, the cutter unit 15 cuts the print paper P into a print size piece and the printing head 16 prints necessary information on the back face of this print paper P (print size piece). The print paper P having the information printed on the back face thereof is clamped by the chuck unit 17 to be sent to the exposure transport rollers 18. During the transport by the exposure transport rollers 18, an exposure operation is effected by the laser beams from the exposing unit E at timing synchronized with the speed of the transport. This exposed print paper P is then changed in its transporting direction to a horizontal direction by the plurality of guide rollers 19 and then is received alternately by the two chuckers 20. Then, with the action of the chuckers 20, the paper is sorted to one of the sorting passages and received by the introducing rollers 21, from which the print paper P is fed into the developing section De.

Though not shown, the exposing unit E includes three kinds of laser source for emitting laser beams of the three primary colors R (red), G (green) and B (blue), modulating elements which are controlled based on image data. In operation, the light (beam) amounts of the laser beams from the three kinds of laser source are adjusted or modulated by the modulating elements and these beams are reflected by a polygon mirror rotatable about a vertical axis and transmitted via an fθ lens.

Each laser beam is emitted in such a manner that the print paper P being transported upward (sub scanning direction) by the exposure transport rollers 18 is scanned and exposed by the beam in a horizontal direction (main scanning direction: the width direction of the print paper). Further, in this exposing unit E, there is effected an exposure control operation in which the timing of the reflection of the laser beam by the polygon mirror is detected by a timing sensor and based on the detected timing, an exposure timing is determined.

With the exposing unit E having the above-described construction, as will be detailed later, in case there occurs disagreement between the center position of the image data in the main scanning direction and the center position of the print paper P in the main scanning direction (width direction of the print paper), the timing for feeding the image data is adjusted with reference to the detected timing of the laser beam detected by the timing sensor, thereby to change the relative position between the print paper P and the image data in the main scanning direction, so that the center position of the image data in the main scanning direction and the center position of the print paper P in the main scanning direction (width direction of the print paper) may brought into agreement with each other.

The developing section De includes a developing unit 25 having an integrated assembly of a plurality of developing solution tanks including a color developing solution tank, a bleaching fixing solution tank and stabilizing solution tanks and includes also a development transport unit 26 having a number of transport rollers for feeding the print paper P to the developing unit 25. The drying section Dr includes a blower 27 for feeding heater-heated air to the print paper P sent from the developing section De.

The above-described construction of the photographic printing apparatus is basically same as that of the conventional apparatus. The apparatus of the invention is characterized in that a test printing operation using predetermined calibration data is facilitated in order to allow adjustment of the exposure position corresponding to each of the print paper magazines Ma, Mb, Mc when the print paper P from one of these magazines Ma, Mb, Mc is to be exposed by the exposing unit E.

Figure 6:
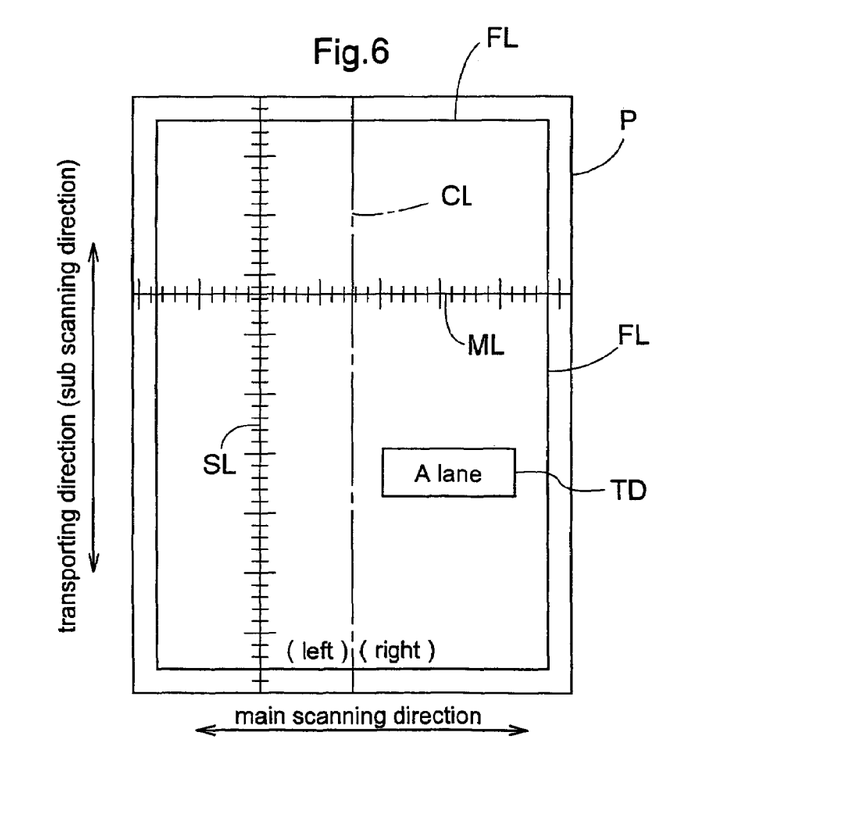
FIG. 6 is a view showing an example of a print paper (piece) printed with calibration data.

As shown in FIG. 6, the print paper P printed with the calibration data (test print) includes, as being formed (printed) thereon, a center line CL indicating the center position in the main scanning direction, a frame line FL in the form of a rectangular frame showing an outer peripheral area slightly smaller than the size of the print paper P, a main graduated line ML having a graduation (scale) formed along the main scanning direction relative to the center line CL, an auxiliary graduated line SL having a graduation (scale) formed along the sub scanning direction and ID information TD (an example of "character information" for identifying a transporting lane) for enabling identification of the particular print paper magazine M which fed the print paper P.

Figure 3:
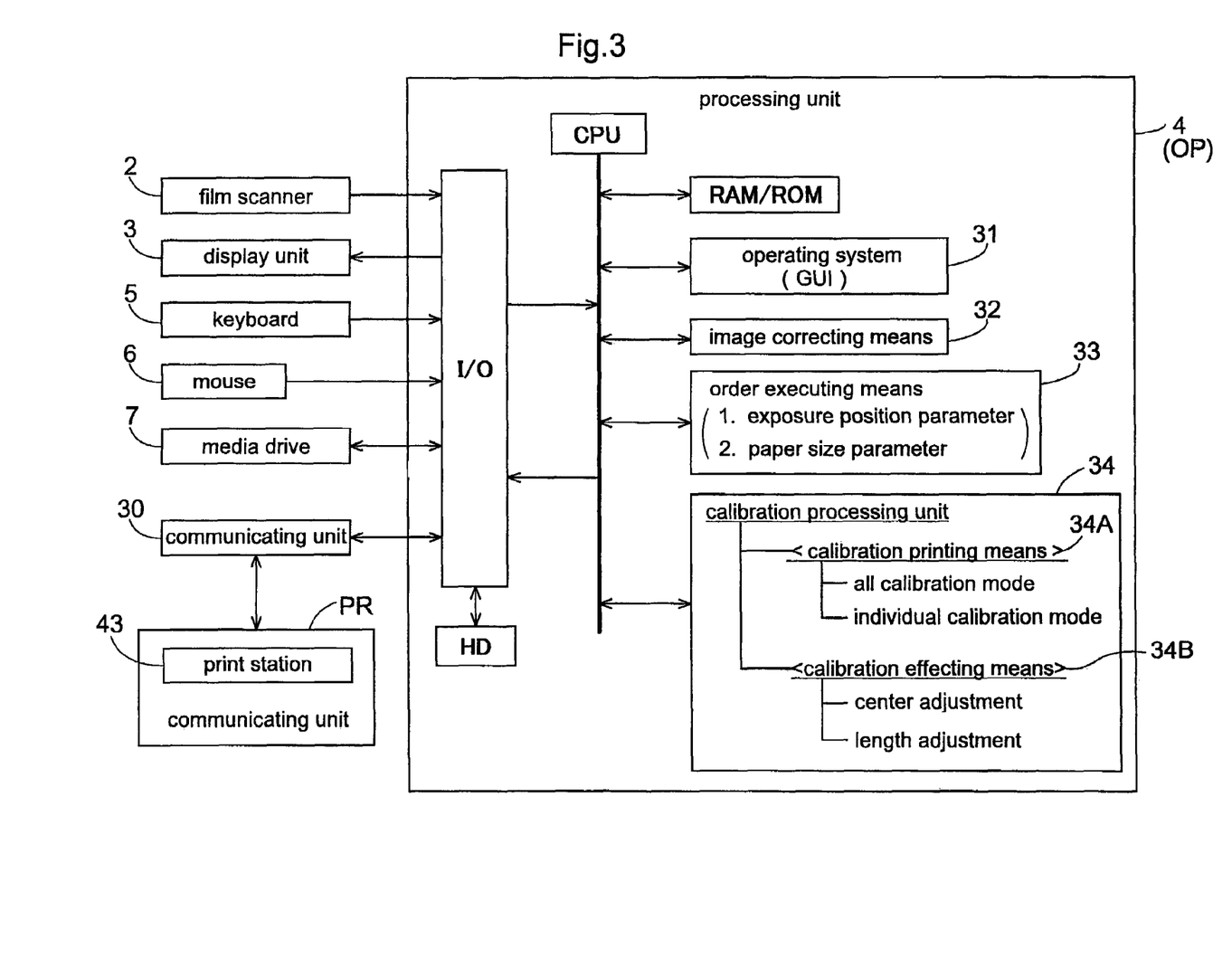
FIG. 3 is a circuit diagram showing functional blocks (sections) of a processing unit.

Referring now to FIG. 3, the processing unit 4 of the operator's station OP is adapted for enabling access, via an input/output interface, to information respectively from the film scanner 2, the display unit 3, the keyboard 5, the mouse 6, the media drive 7, the hard disc HD and a communication unit 30.

The communication unit 30 is configured to transmit and receive the information to and from the print station PR. The processing unit 4 is adapted for enabling a data bus of a microprocessor to access data respectively from a semiconductor memory RAM/ROM, an operating system 31, an image correcting means 32, the order executing means 33, a calibration processing section 34.

In this particular embodiment, it is contemplated that each of the above cited components, i.e. the operating system 31, the image correcting means 32, the order executing means 33, and the calibration processing section 34.is realized in the form of a program stored in the semiconductor memory RAM. Instead, one or some or all of these may be realized in the form of a hardware such as a wired-logic.

The operating system 31 is configured for realizing operations to be effected in the processing unit 4 by the image correcting means 32, the order executing means 33 and the calibration processing section 34, respectively. In addition, this operating system 31 provides a function as GUI (Graphical User Interface) for enabling display of e.g. an operation menu, operation condition on the display unit 3 and display of various buttons also on the display unit 3 for allowing selection of an operation by means of an operator's cursor manipulation.

The image correcting means 32 is provided for realizing various correcting operations on the image data to be printed, such as color correction, contrast correction, etc. The order executing means 33 is adapted for creating (customer's) order data relating to a print size, the number of prints to be made, etc and transmitting such order data together with the image data to the print station PR. This order executing means 33 is adapted also for providing a function of an exposure position parameter and a paper size parameter to the print station together with the order data in correspondence with each print paper magazine M.

The calibration processing means 34 includes a calibration printing means 34A for effecting the exposure of the print paper P by the test printing and a calibration effecting means 34B for effecting calibration based on the print paper P obtained by said exposure (its operational modes will be described later).

Figure 4:
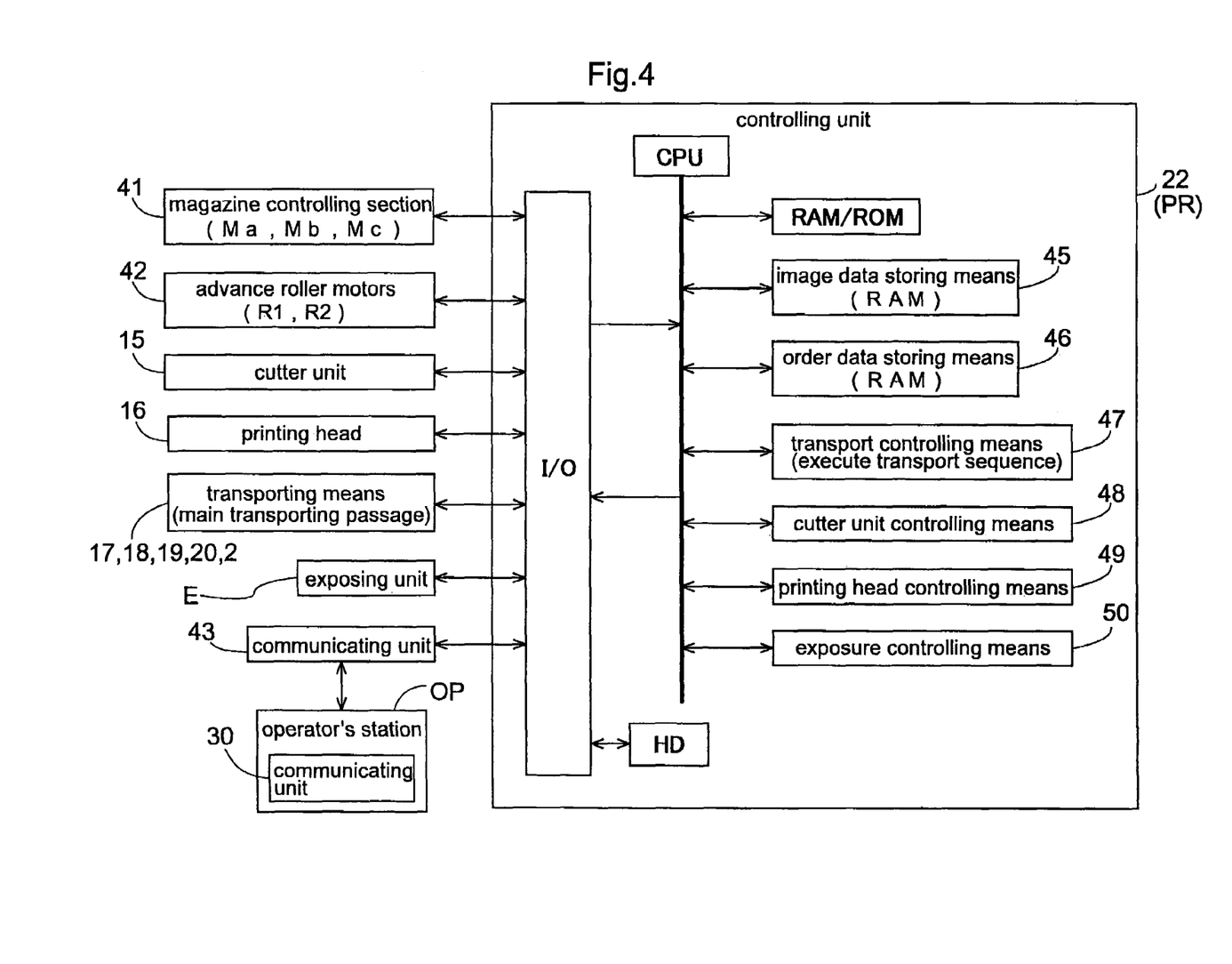
FIG. 4 is a circuit diagram showing functional blocks (sections) of a controlling unit.

Referring now to FIG. 4, the controlling unit 22 for the print station PR is adapted for enabling access, via an input/output interface, to information respectively from a magazine controlling section 41 for controlling entrance/exit of the print paper P to and from the three print paper magazines Ma, Mb, Mc, the transporting mechanism having a stepping motor type advance roller motor 42 for controlling the first advance roller R1 and the second advance roller R2, the cutter unit 15, the printing head 16, the transporting mechanism including the chuck unit 17, the exposure transport rollers 18, the guide rollers 19, the chucker 20 and the introducing rollers 20, the exposing unit E, the hard disc HD, and a communicating unit 43. The communication unit 43 is configured to transmit and receive the information to and from the operator's station OP.

The controlling unit 22 is adapted for enabling a data bus of a microprocessor to access data respectively from a semiconductor memory RAM/ROM, an image data storing means 45 comprising the RAM, an order storing means 46 also comprising the RAM, a transport controlling means 47 for controlling the transport mechanism, a cutter unit controlling means 48 for controlling the cutter unit 15, a printing head controlling means 49 for controlling the printing head 16, and an exposure controlling means 50 for controlling the exposing unit E.

In this particular embodiment, it is contemplated that each of the above cited components, i.e. the cutter controlling means 48, the printing head controlling means 49 and the exposure controlling means 50.is realized in the form of a program stored in the semiconductor memory RAM. Instead, one or some or all of these may be realized in the form of a hardware such as a wired-logic.

The transport controlling means 47 realizes control of transport in the transport mechanism of the print paper P from the designated print paper magazine M. The cutter controlling means 48 effects control of the cutting of the print paper P into a print size specified by the customer's order data and control of cutting of the paper by the cutting timing based on the paper size parameter.

The printing head controlling means 49 realizes a control for printing predetermined necessary data on the back face of the print paper P. The exposure controlling means 50 provides control of the laser beam exposure of the print paper P along the main scanning direction while the paper P is being transported along sub scanning direction by the exposure transport rollers 18.

In this photographic printing apparatus, the transport line for transporting the print paper P from the print paper magazine Ma is referred to as lane A, the transport line for transporting the print paper P from the print paper magazine Mb is referred to as lane B, and the transport line for transporting the print paper P from the print paper magazine Mc is referred to as lane C, respectively.

Figure 5:
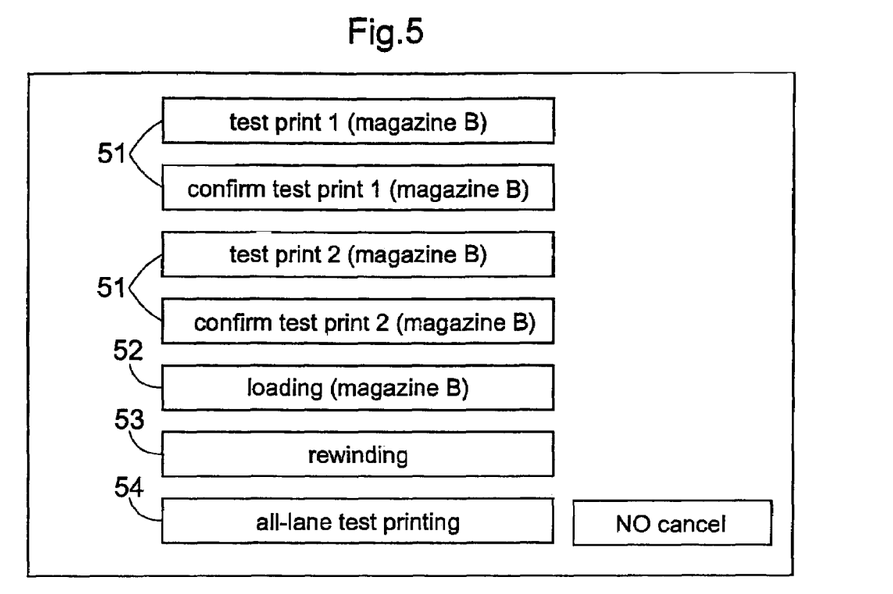
FIG. 5 is a view showing a screen displayed on a display unit for a calibration operation.

When a calibration for exposure control is to be effected, in response to an operator's selection of the operation for calibration, the display unit 3 displays a calibration operation screen shown in FIG. 5. With this display of calibration operation screen, the operator can select buttons shown on the screen by a cursor manipulation, so that the operator can carry out subsequent necessary operations in the GUI manner.

The calibration operation screen shown includes a plurality of buttons 51 for effecting an individual desired test printing on the print paper P from the print paper magazine Mb in the lane B, a loading button 62 for feeding the print paper P from the print paper magazine Mb, a rewinding button 53 for rewinding the fed print paper P, and an all-lane printing button 54 (an example of "all calibration mode button") for effecting an all-lane testing printing operations in all the lanes. Then, as the operator selects a desired button by the cursor, a control operation corresponding to the selected button is effected.

The operation effected when the all-lane test printing button 54 is operated corresponds to the all calibration mode of the calibration printing means 34A of the calibration processing section 34. The operation effected when one of the plurality of buttons 51 for effecting an individual test printing operation corresponds to the individual calibration mode of the calibration printing means 34A of the calibration processing section 34.

Also, in the individual calibration mode, a screen corresponding to each of the lane A, lane B, lane C is displayed. Then, by operating the button 561 for effecting the calibration in each screen, a test printing operation corresponding to lane A, lane B, lane C can be effected. Moreover, the processing mode adopted by the calibration processing section 34 is set such that in all of these screens corresponding respectively to lane A, lane B and lane C, the all-lane test printing button 54 is displayed. Then, by operating the all-lane test printing button 54 displayed as above, the print papers P from the three lanes will be fed into the exposing unit E for test printing operations thereof.

Figure 7:
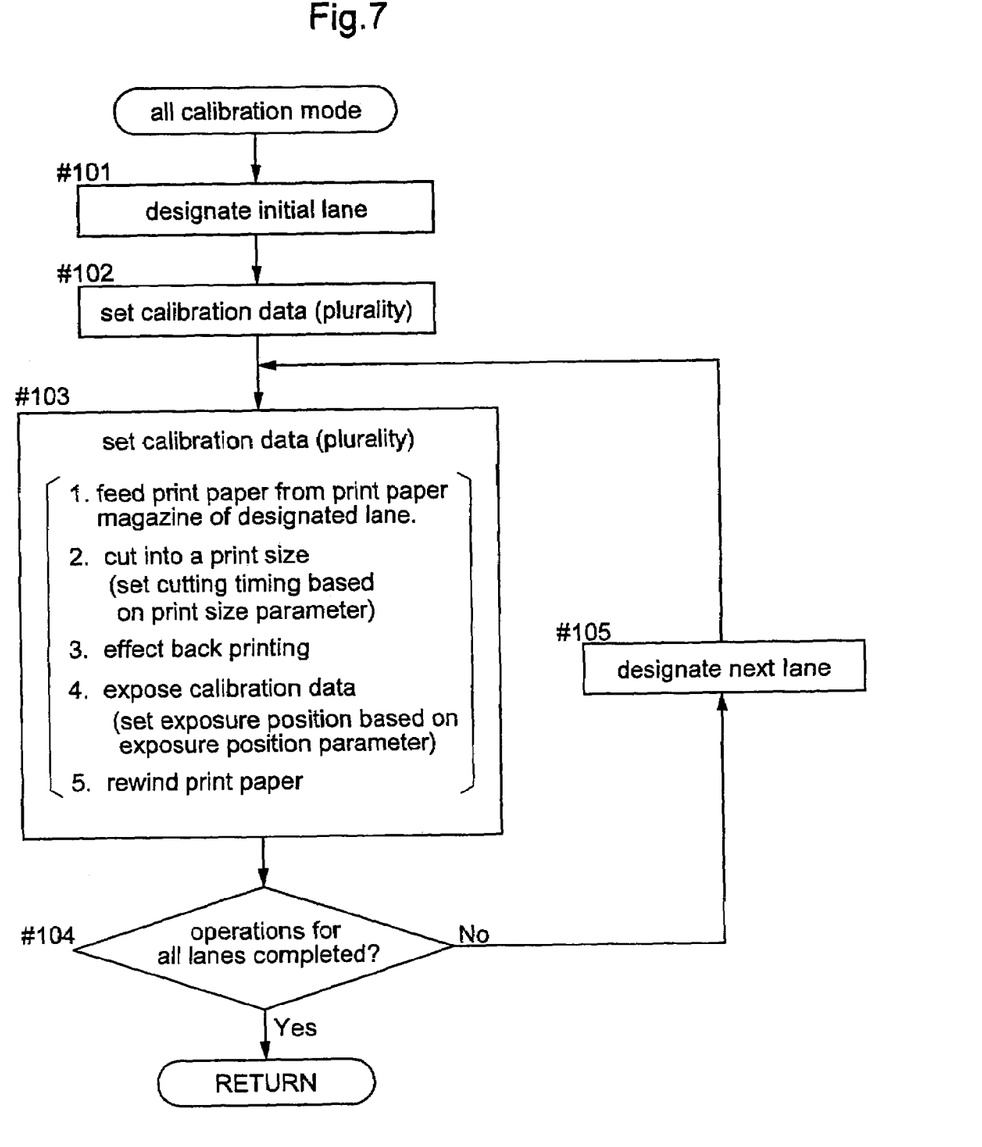
FIG. 7 is a flowchart of an all calibration mode operation.

FIG. 7 is a flowchart illustrating the process in the all calibration mode. Namely, when the all-lane test printing button 54 is operated, an initial lane is designated and the calibration data is set (steps #101 and #102).

Next, by controlling the magazine controlling section 41 and the two advance roller motors 42 (motors corresponding to the first advance roller R1 and the second advance roller R2, respectively), the print paper P is drawn out of the print paper magazine M of the designated lane and the cutter unit 16 is controlled to effect a plurality of cutting operations for cutting the print paper P into print size pieces. Then, by controlling the printing head 16, information indicative of respective lanes are printed on the back faces of the respective print size paper pieces P and these pieces P are charged one after another into the exposing unit E. By controlling this exposing unit E, exposure operations of the calibration data are effected on the respective pieces P. These paper pieces P exposed respectively with the calibration data are sent to the developing unit 25. On the other hand, the remaining portion of the elongate paper P withdrawn from the print paper magazine M is rewound back into this magazine M (step #103).

When the exposure of the calibration data is effected on each of the plurality of print paper pieces P in the exposing unit E, these print paper pieces P to be printed can be of a same size or of different sizes. In particular, in the instant embodiment, it is contemplated that the exposure operation of calibration data is effected on print paper pieces of different sizes (print sizes) and with different calibration data corresponding to the respective sizes. By effecting the exposure of the calibration information on a plurality of print paper pieces P from a same lane as described above, it is possible to obtain e.g. an error based on an average value from the results of the plurality of determinations. In this way, the construction allows more appropriate gasp of error, in comparison with a construction effecting calibration data exposure on a single print paper piece P.

When the above-described calibration data exposures have been effected on the print paper pieces P from all the lanes, the process in this all calibration mode is completed (steps #104, #105).

In effecting the exposure on the print paper P, the cutting operation corresponding to each print size is effected by causing the number of pulses for controlling the two advance roller motors 41 (motors corresponding to the first advance roller R1 and the second advance roller R2) to correspond to the particular print size of the paper P. In the course of this however, due to e.g. a frictional force applied from the lane or the magazine M to the print paper P, there can occur an error in the amount of rotation of the advance rollers and the transporting amount of the print paper P. Hence, in order to absorb or compensate for such error, when the print paper P is cut to the print size by the cutter unit 15 at step #103, there is effected an operation for correcting the number of pulses for driving the advance roller motors 42, based on the paper size parameter set in advance for each lane.

Further, in the course of the exposure of the calibration data, due to a positional relationship between the lane and the print paper magazine M, there can occur a disagreement (or even an error) between the center position of the print paper P in the main scanning direction and the center position of the lane in the main scanning direction. To cope with such situation, the exposure position parameter is set for shifting the image data along the main scanning direction so as to obtain agreement between the center position of the image data in the main scanning direction and the center position of the print paper P in the same direction.

FIG. 6 shows an example of a print paper piece P formed (exposed/printed) with the calibration data by the exposure in this all calibration mode. In this print paper piece P, as described hereinbefore, from the ID information TD and the back print formed by the test printing, the operator can recognize which lane this test print is from. Also, from the center line CL, the frame line FL and the main graduated line ML, the operator can recognize the direction of displacement if any between the center position of the print paper P in the main scanning direction and the center position of the calibration data (corresponding to photographic image data to be printed) as well as an amount of such displacement. Further, from the auxiliary graduated line SL, the operator can recognize the size of the print paper P in the sub scanning direction, that is, an error if any in the cutting timing of the cutter unit 15.

Incidentally, in obtaining the direction and the amount of displacement between the center position of the print paper P in the main scanning direction and the center position of the calibration data (corresponding to photographic image data to be printed), instead of obtaining these by the operator's observing the gradation (scale)of the main graduated line ML as described above, the operator can obtain these by determining the distance between the center line CL and the terminal edge of the print paper P with using a ruler or by visually checking the distance between the frame line FL and the terminal edge of the print paper P.

Similarly, in obtaining the size of the print paper P in the sub scanning direction, the operator can obtain this also by determining the size of the print paper P in the sub scanning direction with using a ruler.

Figure 8:
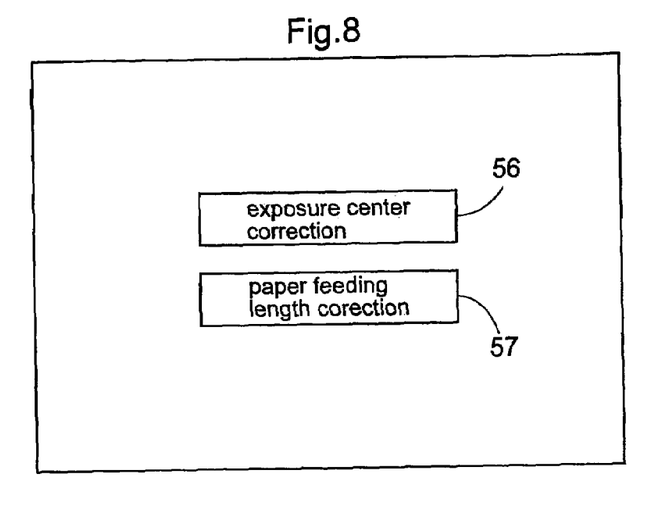
FIG. 8 is a view showing a screen to be displayed on the display unit during execution of a calibration operation.

When the direction and the amount of displacement between the center position of the print paper P in the main scanning direction and the calibration data (corresponding to photographic image data to be printed) and the size of the print paper P in the sub scanning direction have been obtained in the manners described above, in response to the operator's operation, the display unit shows a screen including an exposure center correction button 56 and a paper feeding length correction button 57 as shown in FIG. 8. Then, a correction will be effected by operating either button on the screen (the operation by the calibration effecting means 34B).

Figure 9:
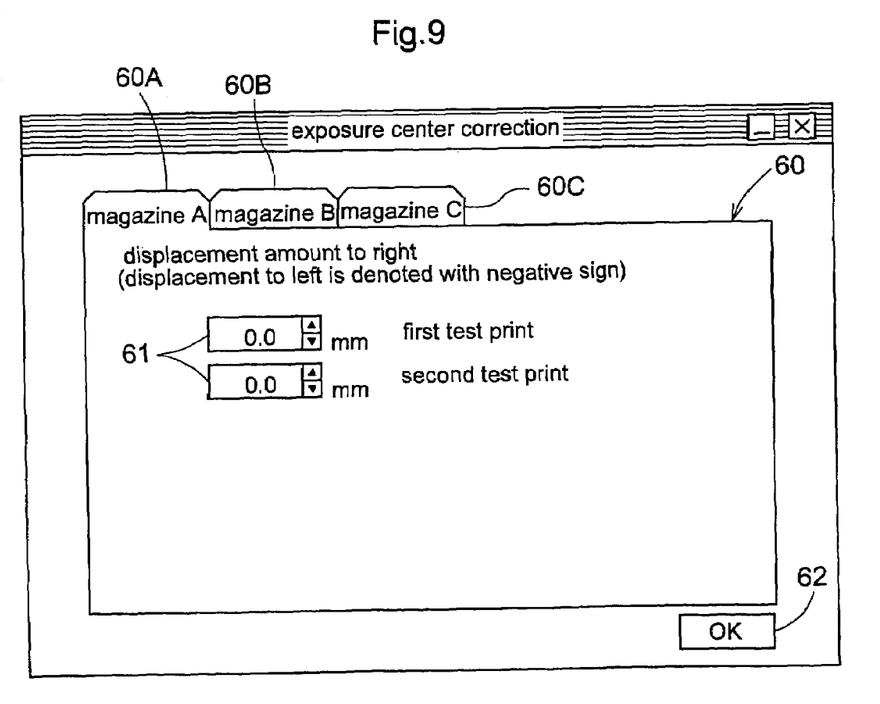
FIG. 9 is a view showing an exposure center correction window.

That is to say, when the exposure center correction button 56 is operated, an exposure center correction window is opened as a calibration screen as shown in FIG. 9. Then, the operator selects a lane corresponding to one of three tabs 60A, 60B, 60C in a correction screen 60 displayed in this window and then input, into two input portions 61, numerical values (representing the amounts of displacement between the center position of the print paper P in the main scanning direction and the center position of the calibration data) obtained from the test prints (print paper pieces P) and operate an OK button 62. With this, an average value between the inputted numerical values is inputted as the exposure position parameter to the order executing means 33.

Figure 10:
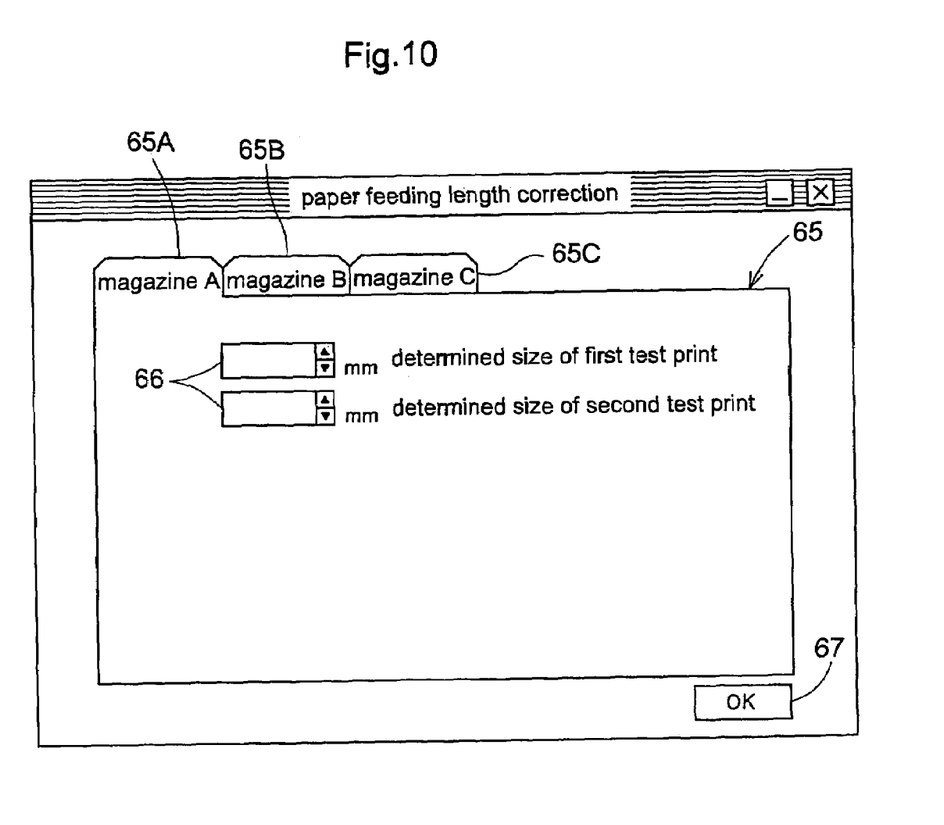
FIG. 10 is a view showing a paper feeding length correction window.

Further, when the paper feeding length correction button 57 is operated, a paper feeding length correction window is opened as shown in FIG. 10. Then, the operator selects a lane corresponding to one of three tabs 65A, 65B, 65C in a correction screen 65 displayed in this window and then input, into two input portions 66, numerical values representing the sizes of the print paper P obtained from the test prints (print paper pieces P) and operate an OK button 67. With this, a coefficient obtained from an average value between the inputted numerical values is inputted as the paper size parameter to the order executing means 33.

With the setting of the exposure position parameter and the paper size parameter to each lane as described above, when printing of image data to a print paper P from a print paper magazine M set in any lane is to be effected, through adjustment of the exposure timing of the image data with reference to the detection timing of the laser beam detected by the timing sensor incorporated within the exposing unit E, the relative position between the print paper P and the image data in the main scanning direction is adjusted, thereby to realize the exposure with agreement between the center position of the print paper P in the main scanning direction and the center position of the image data in the main scanning direction. And, there is also effected the operation of correcting the number of pulses to drive the advance roller motors 42 based on the paper size parameter, so that the print paper P will be cut to an appropriate size.

(a) In the foregoing embodiment, the exposure position parameter and the paper size parameter are stored in the operator's station. Instead, these parameters can be stored in the print station.

(b) In the foregoing embodiment, the exposing unit employed is the laser beam type. Instead, the exposing unit can be e.g. a fluorescent beam type, a unit for projecting an image of the negative film, or an surface exposure type exposing unit adapted for projecting an image of a CRT or a liquid crystal display unit. When the surface exposure type unit is employed, the adjustment of the exposure center position will be effected by shifting the entire exposing unit or shifting its projection lens, etc.

(c) The main scanning direction displacement phenomenon of the image data formed on the print paper can occur due not only to tolerances or errors among the individual transporting means, but also to tolerances or errors among the individual print paper magazines M. For this reason, the apparatus can additionally include a processing system for obtaining information for identifying each print paper magazine M (e.g. a magazine ID) and storing an exposure position parameter and a paper size parameter relating to each combination of the print paper magazine M and the lane. With provision of such additional processing system, whichever lanes the plurality of print paper magazines M may be set, based on the combination of each lane and the magazine M, an exposure position parameter corresponding thereto will be retrieved from the processing system for enabling optimum calibration.

I claim:

1. A photographic printing apparatus comprising:
    a transporting section for cutting photosensitive material drawn from one of a plurality of magazines each accommodating therein an elongated photosensitive material into a print size piece by a cutter unit and then feeding this material piece into an exposing unit;
    an order executing means for effecting exposure of image data at the exposing unit on the material piece transported by the transporting section; and
    a calibration printing means for effecting exposure of predetermined calibration data at the exposing unit on the material piece transported by the transporting section;
    wherein said calibration printing means is operable to effect an all calibration mode operation in which the plurality of magazines are designated one after another, the photosensitive materials from the respective designated magazines are cut into the print size pieces and the exposing operations of the predetermined calibration data for indicating an exposure center position relative to the width of the photosensitive material are effected on the print size pieces one after another continuously.

2. The photographic printing apparatus according to claim 1, further comprising:

a processing unit for effecting the exposure of the image data by the order executing means and effecting also the exposure of the calibration data by the calibration printing means; and a display unit for displaying processing information processed by the processing unit;

wherein when an operator selects a calibration operation, said processing unit causes said display unit to display an individual calibration mode button for effecting an individual calibration mode operation for each of the plural magazines and an all calibration mode button for effecting said all calibration mode operation, and after the exposure of the calibration information, said processing unit causes said display unit to display, for each magazine, a calibration screen for allowing adjustment of a center of the exposure position relative to the photosensitive material from that magazine.

3. The photographic printing apparatus according to claim 1, wherein said all calibration mode operation processes character information for identifying a magazine or a transporting lane for the photosensitive material, in addition to the calibration information.

4. The photographic printing apparatus according to claim 1, wherein said calibration data further includes data, for identifying a size of the photosensitive material along a sub scanning direction, in addition to the data for indicating the exposure center position.

* * * * *